US006836091B2

(12) United States Patent
Fujita et al.

(10) Patent No.: US 6,836,091 B2
(45) Date of Patent: Dec. 28, 2004

(54) SERVO CONTROL DEVICE OF DC MOTOR

(75) Inventors: Youichi Fujita, Tokyo (JP); Satoshi Kawamura, Tokyo (JP); Sotsuo Miyoshi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/416,886

(22) PCT Filed: Sep. 17, 2001

(86) PCT No.: PCT/JP01/08065

§ 371 (c)(1), (2), (4) Date: May 16, 2003

(87) PCT Pub. No.: WO03/026122

PCT Pub. Date: Mar. 27, 2003

(65) Prior Publication Data

US 2004/0012364 A1 Jan. 22, 2004

(51) Int. Cl.[7] .................................... G05B 11/36

(52) U.S. Cl. ...................... 318/609; 318/599; 318/560; 318/850; 388/800

(58) Field of Search ................................ 318/609, 599, 318/560; 388/800, 804, 809

(56) References Cited

U.S. PATENT DOCUMENTS

| | | | | |
|---|---|---|---|---|
| 5,726,545 | A * | 3/1998 | Iwashita et al. | 318/432 |
| 2002/0177920 | A1 * | 11/2002 | Kasagami et al. | 700/170 |

FOREIGN PATENT DOCUMENTS

| | | |
|---|---|---|
| JP | 3-055379 | 3/1991 |

* cited by examiner

*Primary Examiner*—Karen Masih
(74) *Attorney, Agent, or Firm*—Sughrue Mion, PLLC

(57) ABSTRACT

At the time of controlling a servo mechanism, a servo control detects that the position of a driven body is in the steady judgment region of a target position and varies a control constant (PI value) in the steady judgment region, so it is made possible to reduce an oscillation of the driven body in the steady judgment region.

4 Claims, 6 Drawing Sheets

MOTOR
21
V
53
54
55
56
E
57
58
59
60
SWITCHING CIRCUIT
52
44
CONTROLLER BLOCK
a
b
DIGITAL OUTPUT PORT
50
a
b
PWM OUTPUT PORT
51
ON/OFF
DUTY
EXCITATION SWITCHING AND DUTY COMPUTING SECTION
49
FILTER
46
A/D INPUT PORT
45
PI CONTROL COMPUTING SECTION
48
TARGET VALUE DETERMINING SECTION
47
POWER SOURCE IC
VALVE POSITION SENSOR
41
42
43

FIG.4
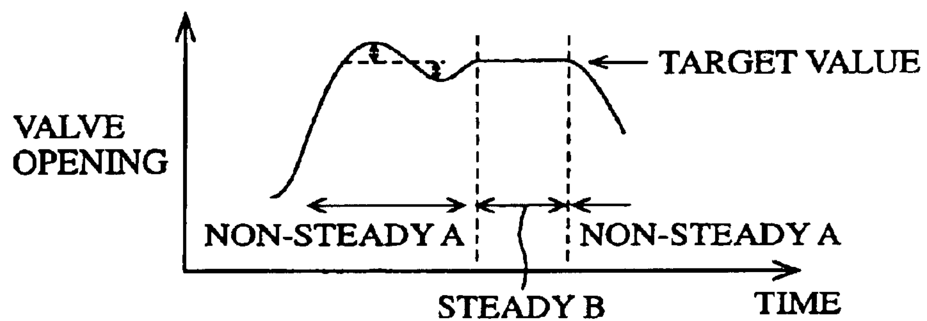
FIG.6
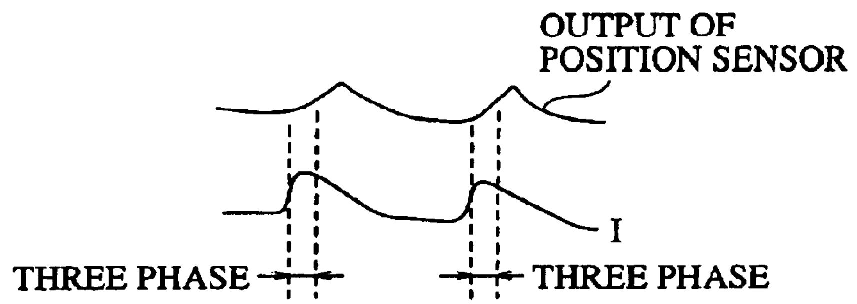
FIG.8
OUTPUT OF POSITION SENSOR
$V_2$
$V_1$ $V_3$
TIME MOTOR
SWITCHING CIRCUIT
V
E
DIGITAL OUTPUT PORT
PWM OUTPUT PORT
a
b
ON/OFF
DUTY
EXCITATION SWITCHING AND DUTY COMPUTING SECTION
CONTROLLER BLOCK
FILTER
A/D INPUT PORT
SPEED DETECTING SECTION
DEVIATION DETECTING SECTION
PI CONTROL COMPUTING SECTION
TARGET VALUE DETERMINING SECTION
STEADY JUDGMENT SECTION
POWER SOURCE IC
VALVE POSITION SENSOR MOTOR
21
V
E
53
54
55
56
57
58
59
60
SWITCHING CIRCUIT
52
71
72
73
74
75
44
CONTROLLER BLOCK
DIGITAL OUTPUT PORT
PWM OUTPUT PORT
50
51
a
b
ON/OFF
DUTY
EXCITATION SWITCHING AND DUTY COMPUTING SECTION
49
A/D INPUT PORT
45
FILTER
46
PI CONTROL COMPUTING SECTION
48
TARGET VALUE DETERMINING SECTION
47
POWER SOURCE IC
VALVE POSITION SENSOR
41
42
43

SERVO CONTROL DEVICE OF DC MOTOR

TECHNICAL FIELD

The present invention relates to a servo control device of a DC motor for controlling an object to be controlled of a servomechanism for controlling a mechanical position or an angle, for example, an exhaust gas recirculation (hereinafter referred to as EGR) valve provided in a recirculation system of an exhaust gas, a throttle valve, an actuator of a turbocharger and the like.

BACKGROUND ART

FIG. 1 shows a diagram in which a valve 11 of an EGR valve arranged in an exhaust gas return passage (c) for making an exhaust gas passage (a) of an engine E communicate with an intake gas passage (b) thereof is an object to be controlled and in which a DC motor 21 is driven by the output of a control section 50 to control the opening of the valve 11.

FIG. 2 is a longitudinal cross sectional view to show a constitution of the EGR valve to which a servo control device is applied having a DC motor 21 as a driving source. In FIG. 2, a reference numeral 1 denotes a valve body in which a passage communicating with the exhaust gas return passage (c) is disposed in a recirculation system of an exhaust gas. When the valve 11 is moved up as shown in the drawing, it is put into contact with a seat 12 to close the exhaust gas return passage c and when the valve 11 is moved down, it is separated from the seat 12 to open the exhaust gas return passage (c).

A reference numeral 21 denotes a DC motor to be a driving unit (torque generating source) of a valve for opening/closing an exhaust gas passage, 22 denotes a motor case mounted on the valve body 1, 23 denotes a rotor rotatably supported in the motor case 22 via bearings 24, 25, and the rotor 23 has a screw hole 23*a* made through the central portion of a shaft. A reference numeral 26 denotes a magnet mounted on the outer peripheral portion of the rotor 23, 27 denotes a stator core surrounding the outer periphery of the magnet 26, and a predetermined gap is formed between this stator core 27 and the above mentioned magnet 26.

A reference numeral 28 denotes a coil arranged in the stator core 27 and constituting a stator, 29 denotes a motor shaft to be a valve driving shaft, and this motor shaft 29 is made in a screw shaft and screwed into the screw hole 23*a* of the above mentioned rotor 23 and moved in an axial direction by the rotation of the above mentioned rotor 23.

A reference numeral 30 denotes a valve shaft abutting member integrally formed with the motor shaft 29. By making the top end of a valve shaft 13 having the above mentioned valve 11 at its top end abut against the tip (bottom end in FIG. 1) of this valve shaft abutting member 30, the valve shaft 13 is made to follow a movement in an axial direction of the above mentioned motor shaft 29 to thereby open/close the above mentioned valve 11.

A reference numeral 31 denotes a cover mounted on an end surface on the valve shaft abutting member 30 side in the motor case 22, 32 denotes a spring retaining member mounted on the tip side of the valve shaft abutting member 30, 33 denotes a spring hung between the spring retaining member 32 and the above mentioned cover 31 for urging the valve, and this spring 33 urges the valve 11 at the tip of the valve shaft via the valve shaft abutting member 30 in a direction that opens the valve 11. A reference numeral 34 denotes a commutator rotating integrally with the rotor 23 and having a shaft hole 34*a* at its central portion.

A reference numeral 35 denotes a power source side case mounted on an opening end on the commutator 34 side of the motor case 22. This power source side case 35 is an integrally molded part made of synthetic resin and constitutes a main body of a device for passing current through the DC motor 21 and is an integral combination of a built in sensor portion 36 in which a position sensor (not shown) for detecting the opening of the above mentioned valve is built and an input/output connector portion 37 in which a connector terminal is built.

A reference numeral 38 denotes a brush holding cylindrical portion integrally molded with a wall opposed to the commutator 34 in the power source side case 35, and 39 denotes a brush slidably inserted into the brush holding cylindrical portion 38 for passing a current. This brush 39 is made of carbon powder and copper powder and is connected via a lead wire (not shown) to the connector terminal of the above mentioned input/output connector portion 37.

Next, an operation will be described. Passing a current through the coil 28 via the brush 39 and the commutator 34 generates a rotational torque in the rotor 23 by an interaction between a magnetic field generated by the coil 28 and the magnetic field of the magnet 26. When the rotor 23 is rotated by the rotational torque, the motor shaft 29 screwed into the screw hole 23*a* of the rotor 23 is fed by the screw and moved straight in an axial direction.

Here, in a case where the motor shaft 29 is moved downward in FIG. 1, the valve shaft abutting member 30 is pushed by the motor shaft 29 in the direction of an urging force of the spring 33 to open the control valve 11 via the valve shaft 13 against which the valve shaft abutting member 30 abuts. Then, when the valve 11 moves near to a target position and a difference between a present position and a target position becomes nearly equal to zero, an electric power required to hold the valve 11 at its position against the restoring force of the return spring 18 is supplied to the DC motor 21.

On the other hand, when the rotor 23 of the DC motor 21 is rotated in a direction opposite to the above mentioned direction, the motor shaft 29 is moved upward in FIG. 1 and the valve shaft 13 abutting against the valve shaft abutting member 30 integral with the motor shaft 29 follows the motor shaft 29 by the restoring force of the return spring 18 to close the valve.

FIG. 3 is a diagram of one example of a circuit constitution to show a servo control device for controlling the driving of the above mentioned DC motor 21. In FIG. 3, a reference numeral 41 denotes a position sensor and this position sensor 41 has a movable contact 43 moving on a resistor 42 to which a constant voltage is applied by a power supply terminal and when the movable contact 43 moves with the rotation of the rotor 23, a voltage responsive to its moving position, that is to say, a voltage in compliance with the valve position is outputted as a detection signal.

A reference 44 denotes a controller block and this controller block 44 has an A/D input port 45 inputted with the detection signal from the valve position sensor 41, a filter 46 for reading the output of the A/D input port 45, a PI control computing section 48 for performing a PI control computation based on the output of the filter 46 and the output of a target value determining section 47, an excitation switching and duty computing section 49 for performing an excitation duty computation based on the output of the PI control computing section 48, a digital output port 50 for outputting an ON/OFF signal based on the output of the excitation switching and duty computing section 49 and a PWM output port 51 for outputting a PWM signal.

A reference numeral 52 denotes a switching circuit for controlling the passing of a current through the DC motor 21. A (+) side end of the DC motor 21 is connected to a connection point of semiconductor switching devices (hereinafter referred to as switch device) 53, 54 connected in series and a (−) side end thereof is connected to a connection point of semiconductor switching devices (hereinafter referred to as switch device) 55, 56 connected in series.

To each of the above mentioned switch devices 53, 55 is connected each of transistors 57, 58 which is turned ON by the output of the digital output port 50, and to each of the above mentioned switch devices 54, 56 is connected each of transistors 59, 60 which is turned ON/OFF by the output of the PWM output port 51.

Next, an operation will be described.

When a target value is determined by the target value determining section 47, the PI control computing section 48 performs the PI control computation based on the above mentioned target value and a detection value corresponding to a present valve position, which is detected by the position sensor 41 and inputted via the A/D input port 45 and the filter 46, and then the excitation switching and duty computing section 49 performs the excitation duty computation based on this computation result.

The digital output port 50 outputs an ON signal to a terminal (a) based on the output of the excitation switching and duty computing section 49 to bring the switch device 53 into conduction via the transistor 57 to thereby connect the (+) terminal of the DC motor 21 to a power applying terminal V. On the other hand, the PWM output port 51 outputs a PWM signal to an output terminal (b) based on the output of the excitation switching and duty computing section 49 to control a conduction of the switch device 56 via the transistor 60 to connect the (−) terminal of the DC motor 21 to an earth E thereby passing a current in a direction shown by a solid line.

In this manner, the DC motor 21 is operated to rotate the rotor 23, the motor shaft 29 is moved down by the rotation of its rotor 23, and by this moving down motion the valve shaft 13 is moved in the same direction against the return spring 18 to move the control valve 11 to a target position to thereby open the control valve 11. Then, when the control valve 11 moves near to the target position and the PI control computing section 48 recognizes that a difference between a detection value of a present valve position detected by the position sensor 41 and the target value becomes nearly equal to zero, the excitation switching and duty computing section 49 computes duty in response to the output signal of the PI control computing section 48 and supplies the DC motor 21 with an electric power required to hold the valve 11 at its target valve opening position against the restoring force of the return spring 18 based on this computed duty.

Since the conventional servomechanism to which a DC motor is applied is constituted as the above mentioned way, the valve is oscillated by the following causes when it performs the servo control near the target valve opening position.

(1) Since variations in torque are partially caused by variations in the current passing through the motor, the valve as a driven body to be subjected to a feed back control is not made stable near the target position.

(2) When the output of the sensor is read in, if the output of the sensor is mixed with motor noises, the output of the sensor can not be read in with high accuracy, so that the valve as the driven body to be controlled based on the output is not made stable in the vicinity of the target position.

There is presented a problem that the occurrence of oscillation of the valve prevents the valve from being stopped stably at the target position.

The present invention has been made to solve the above mentioned problem, and an object of the present invention is to provide a device for reducing the oscillation caused when a DC motor is subjected to a servo control.

DISCLOSURE OF THE INVENTION

A servo control device of a DC motor in accordance with the present invention includes: a DC motor for driving a driven body against a restoring force; a position sensor for detecting a moving position of the driven body; a speed detecting section for detecting a moving speed of the driven body based on a detection value of the position sensor; a deviation detecting section for detecting a deviation of the driven body based on the detection value of the position sensor; a PI control computing section that receives the detected moving speed and the detected deviation and a target value predetermined by a target value determining section and performs a PI control computation; a steady judgment section that judges from the moving speed and the deviation whether conditions of a steady region are held and starts the PI control computing section by an output signal when the condition of the steady region are judged to hold to thereby make the PI control computing section execute the PI control computation; and an excitation switching and duty computing section for outputting a power supply control signal of the DC motor based on an output signal of the PI control computing section.

By this arrangement it is made possible to reduce an oscillation of the valve in a case where the valve is held in a steady region that is vicinity of a target valve opening position.

In the servo control device of a DC motor in accordance with the present invention, the detection value from the position sensor is read in three times and the second largest detection value is adopted.

By this arrangement it is made possible to input the detection value of the position sensor with the steep noise removed and thus to correctly perform the servo control of the Dc motor even if noise caused by a brush part of the DC motor with a brush is introduced into the position sensor to make steep noise and this steep noise is inputted as the detection value of the position sensor.

A servo control device of a DC motor in accordance with the present invention includes: a DC motor for driving a driven body against a restoring force; a position sensor for detecting a moving position of the driven body; a PI control computing section that receives a detection value of the position sensor and a target value predetermined by a target value determining section and performs a PI control computation; an excitation switching and duty computing section for outputting a power supply control signal of the DC motor based on an output signal of the PI control computing section; a current detecting section for detecting current passing through the DC motor; and a control section for controlling the excitation switching and duty computing section so as to suppress a variation in the current passing through the DC motor based on a detection value of the current detecting section.

By this arrangement it is made possible to suppress a variation in torque caused by an abrupt variation in the current passing through the DC motor and thus to prevent the driven body from being oscillated.

In the servo control device of a DC motor in accordance with the present invention, the detection value from the position sensor is read in three times and the second largest detection value is adopted.

By this arrangement it is made possible to input the detection value of the position sensor with the steep noise removed and thus to correctly perform the servo control of the Dc motor even if noise caused by a brush part of the DC motor with a brush is introduced into the position sensor to make steep noise and this steep noise is inputted as the detection value of the position sensor.

BRIEF DESCRIPTION OF THE DRAWINGS

FIG. 4 is an opening characteristic graph of a valve.

FIG. 6 is a waveform diagram to show a relationship of the output of a position sensor with respect to a current passing through the motor.

FIG. 8 is an explanatory diagram to show that an error occurs in the reading of the output of a sensor.

BEST MODE FOR CARRYING OUT THE INVENTION

Hereinafter in order to describe the present invention in more detail, the best mode for carrying out the invention will be described below with reference to the accompanied drawings.

Embodiment 1

FIG. 4 is a control characteristic graph at the time of a servo control of a DC motor. A reference symbol A denotes a non steady region in which a constant PI is not varied and B denotes a steady region in which the constant PI is varied. In a judgment whether or not a region is a steady region, when a condition relating to a deviation of "displacement (present value−target value)<steady judgment displacement (that is a value determined by an experiment in advance)" and a condition relating to a speed of "speed<steady judgment speed (that is a value determined by an experiment in advance)" are held in the region, the region is judged to be a steady region.

Figure 1:
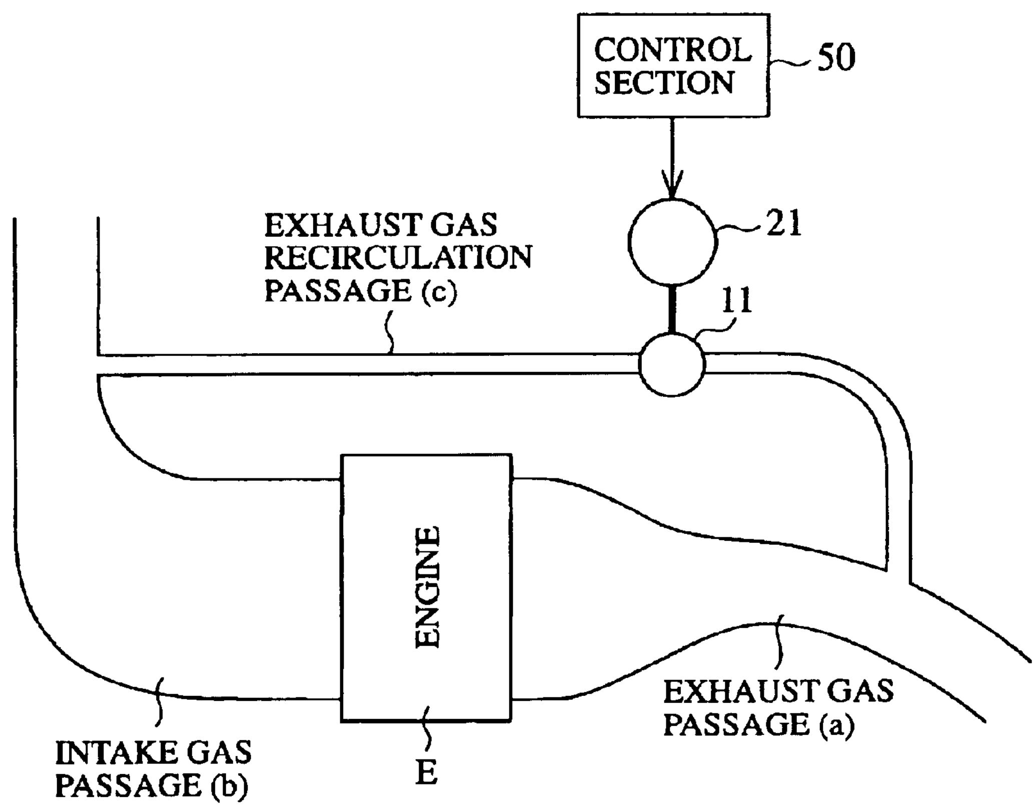
FIG. 1 is a schematic explanatory diagram of an engine exhaust gas system.
Figure 2:
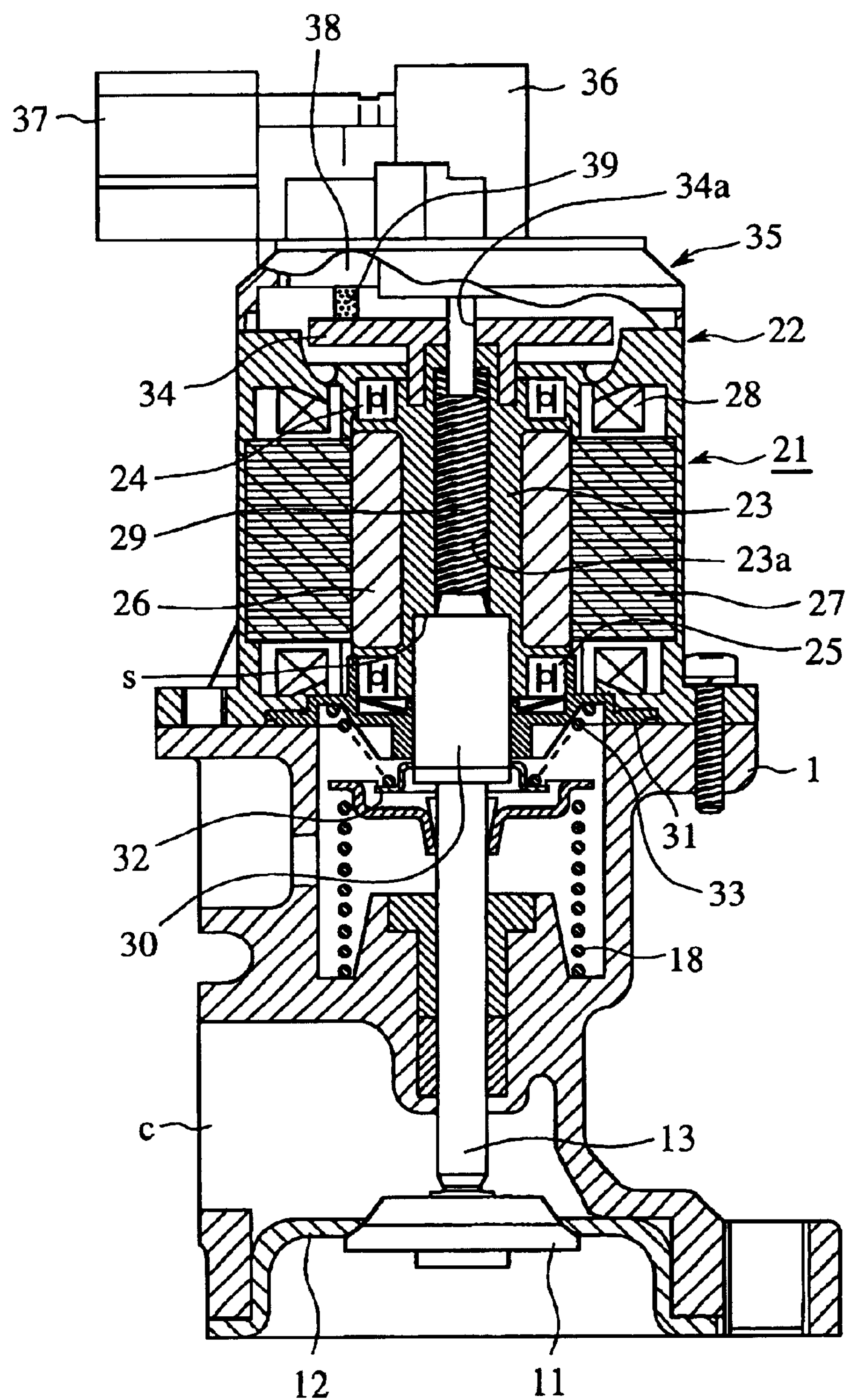
FIG. 2 is a longitudinal cross sectional view to show a constitution of an EGR valve.
Figure 3:
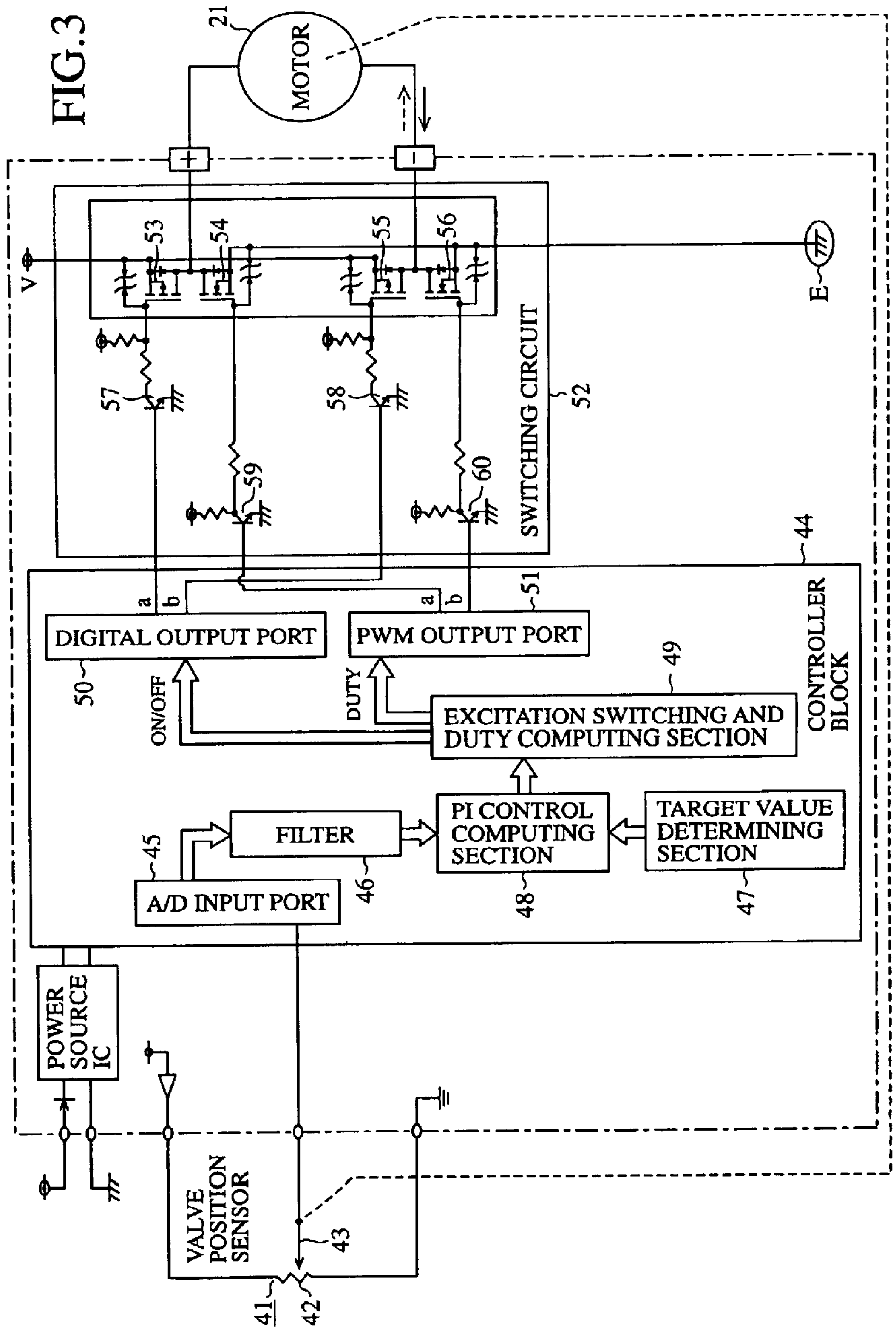
FIG. 3 is a control circuit diagram of a DC motor.
Figure 5:
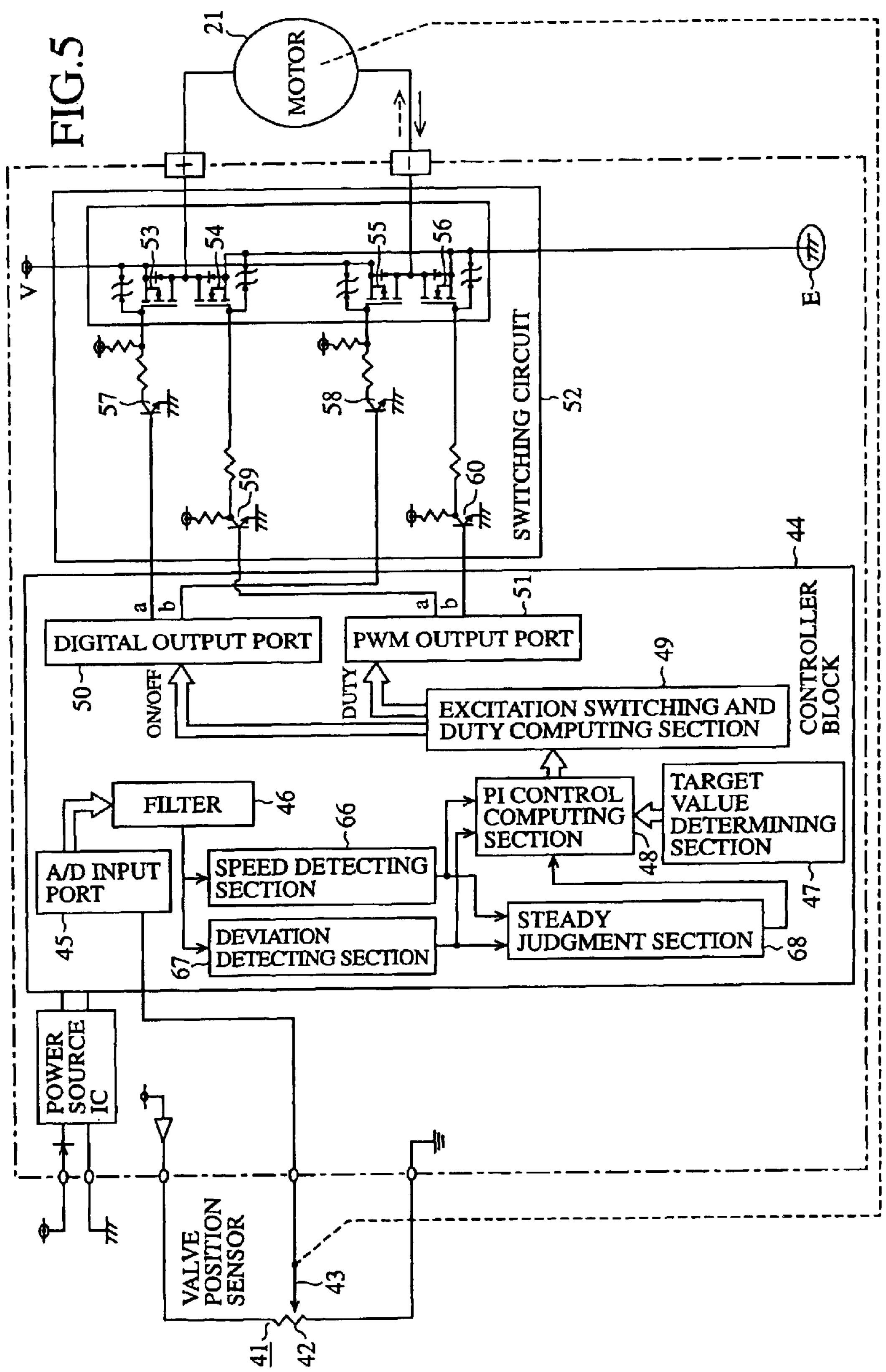
FIG. 5 is a control circuit diagram of a DC motor in a servo control device of the DC motor in accordance with embodiment 1 of the present invention.

FIG. 5 is a servo control circuit diagram of a DC motor to show a constitution of embodiment 1. In FIG. 5, a reference numeral 66 denotes a speed detecting section for detecting a speed based on an output of a position sensor 41 which is read via an A/D input port 45 and a filter 46, 67 denotes a deviation detecting section for detecting a deviation based on an output of the position sensor 41 which is read via the A/D input port 45 and the filter 46, 68 denotes a steady judgment section that makes a judgment, based on the outputs of the speed detecting section 66 and the deviation detecting section 67, whether or not the condition of the steady region are held and that when it judges the condition of the steady region are held, it makes a PI control computing section 48 execute a PI control computation. The other constitution is the same as the above mentioned conventional circuit constitution shown in FIG. 3, so the same parts are denoted by the same reference symbols and their further descriptions will be omitted.

Next, an operation will be described.

When the target value determining section 47 determines a target value, the speed detecting section 66 detects a speed and the deviation detecting section 67 detects a deviation based on the above mentioned target value and a detection value corresponding to a present valve position, detected by the position sensor 41 and inputted via the A/D input port 45 and the filter 46, and the steady judgment section 68 makes a judgment whether the condition of the steady region are held based on the detected speed signal and the detected deviation signal. In a case where the condition of the steady region are not held, that is to say in a case of a non steady region A shown in FIG. 4, the PI control computing section 48 does not perform a computing action. For this reason, the excitation switching and duty computing section 49 outputs a previously determined duty signal to the PWM output port 51.

The digital output port 50 outputs an ON signal to a terminal (a) based on an output of the excitation switching and duty computing section 49 to bring the switch device 53 into conduction via a transistor 57 to thereby connect the (+) terminal of the DC motor 21 to the power applying terminal V. On the other hand, the PWM output port 51 outputs a PWM signal to the output terminal (b) based on the output of the excitation switching and duty computing section 49 to control a conduction/non conduction of the switch device 56 via the transistor 60 to connect the (−) terminal of the DC motor 21 to an earth E to thereby pass a current in a direction shown by a solid line arrow.

In this manner, the DC motor 21 is rotated to move down the motor shaft 29 by the rotation of its rotor 23 to move the valve shaft 13 in the same direction against the return spring 18 by this down movement thereby moving a valve 11 to a target position to open the valve 11. Then, when the steady judgment section 68 detects that the valve 11 moves near to the target position, that is to say the valve 11 enters the steady region based on the above mentioned speed detection signal and the deviation detection signal, the PI control computing section 48 is started by the steady judgment output of the steady judgment section 68 to perform the PI control computation based on the speed signal from the speed detecting section 66 and the deviation signal from the deviation detecting section 67 to control the excitation switching and duty computing section 49 by the output of the PI control computing section 48 thereby to make the excitation switching and duty computing section 49 output a signal at contracted duty intervals, for example.

As described above according to embodiment 1, the servo control detects that the valve 11 enters the steady judgment region of the target position and varies a control constant (PI value) in the steady judgment region to vary duty, so it is made possible to vary the PI constant such that the amount of control of the servo control does not vary substantially in the steady region and thus to reduce the oscillation of the valve in the steady judgment region.

Embodiment 2

FIG. 6 is a diagram to show that the detection signal of the position sensor 41, that is to say a position of the valve 11 is varied by a change in current passing through the DC motor 21, and in embodiment 2, it is intended to suppress such a variation in position of the valve 11.

Figure 7:
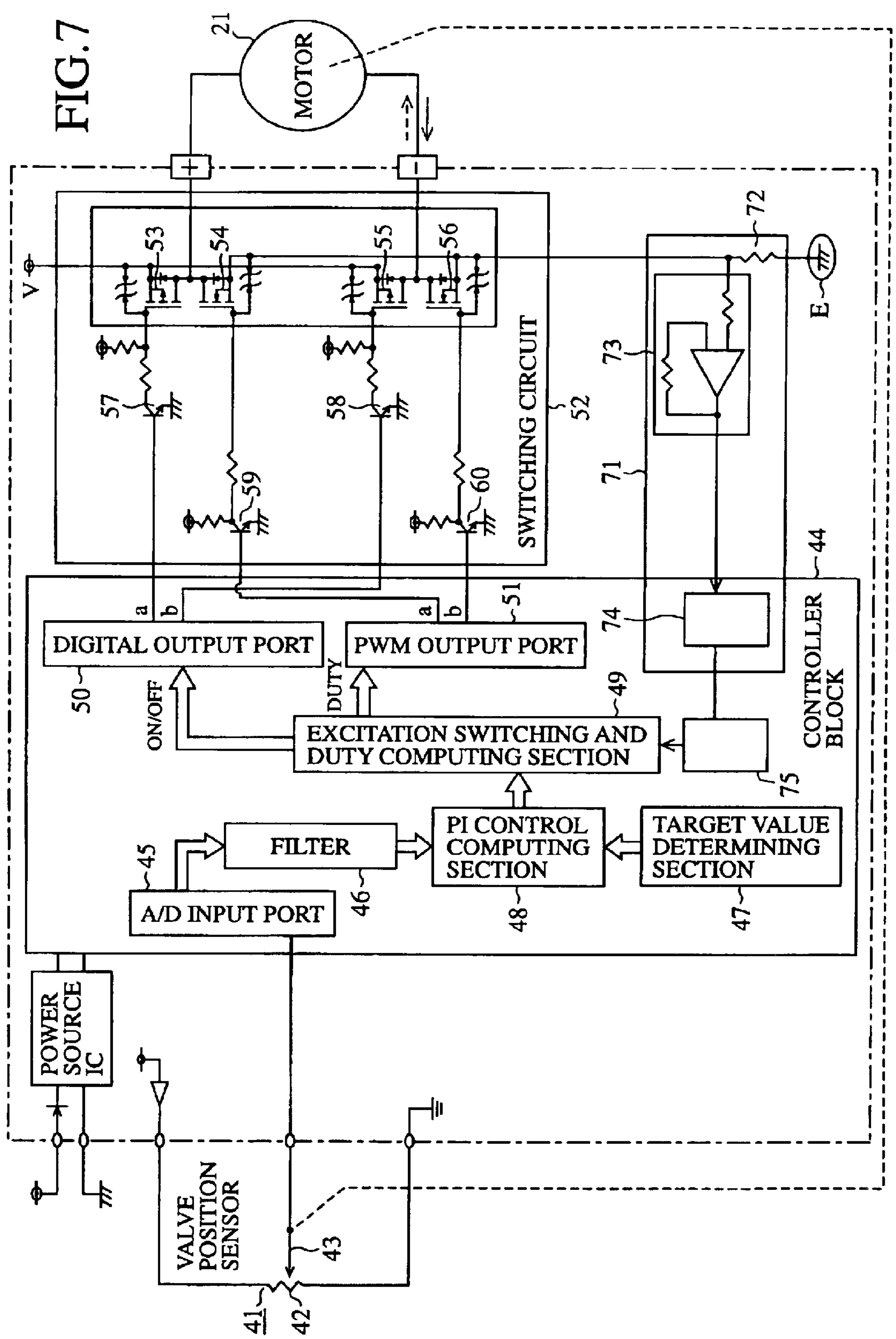
FIG. 7 is a control circuit diagram of a DC motor in a servo control device of the DC motor in accordance with embodiment 2 of the present invention.

FIG. 7 is a diagram to show the servo control device of a DC motor showing the constitution of embodiment 2. In FIG. 7, a reference numeral 71 denotes a current detecting section for detecting current passing through the DC motor 21, and the current detecting section 71 includes a resistor 72, a comparator 73, an input port and the like. A reference numeral 75 denotes a control section of feed forward or the like for controlling the excitation switching and duty computing section 49 based on a detection signal of the current detecting section 71. Then, the other constitution is the same as the constitution in the above mentioned prior art shown in FIG. 3 and the same parts are denoted by the same reference symbols and their further descriptions will be omitted.

Next, an operation will be described.

When the valve 11 is moved in a direction that opens the valve 11 by the same operation as described in the prior art to come near to a target value and then the DC motor 21 is made to generate a driving force equal to a restoring force of the return spring 18 to hold the valve 11 at the target position, if the current detecting section 71 detects that current passing through the DC motor 21 is suddenly changed, then the control section 75 inputted with a detection signal from the current detecting section 71 is made possible to control the excitation switching and duty computing section 49 so as to suppress the variations in the current passing through the DC motor 21 thereby preventing the valve 11 from being oscillated by a change in the current passing through the DC motor 21.

As described above, according to this embodiment 2, the DC motor 21 is made possible to generate the driving force equal to the restoring force of the return spring 18 to hold the valve 11 at the target position and, when the current passing through the DC motor 21 is increased, this increase in the current is automatically reduced so it is made possible to prevent the valve 11 from being oscillated by the increase in the current.

Embodiment 3

FIG. 8 is a diagram to show the relationship between time and the detection signal of the position sensor 41. When the detection signal of the position sensor 41 for detecting the moving position of the valve 11 of a driven body is read in, if motor noises are added to the detection signal, the detection signal is varied substantially as compared with the other detection signal to make it difficult to read a correct detection value in. Thus, the detection signal of the position sensor 41 is arranged to be read in three times and the second largest read in detection signal, for example, V1 in FIG. 8 is adopted. This medium value picking up function is imparted, for example, to the A/D input port 45 shown in FIG. 5 or FIG. 7 and the second largest read in detection value is supplied to the filter 46.

As described above according to this embodiment 3, adopting the second largest read-in detection signal makes it possible to exclude the detection signal affected by noises and to read correct detection signal in and thus to perform the servo control stably.

INDUSTRIAL APPLICABILITY

As described above the servo control device of a DC motor in accordance with the present invention is suitable for stabilizing an operation in the servo control.

What is claimed is:

1. A servo control device of a DC motor comprising:

a DC motor for driving a driven body against a restoring force;

a position sensor for detecting a moving position of said driven body;

a speed detecting section for detecting a moving speed of said driven body based on a detection value of the position sensor;

a deviation detecting section for detecting a deviation of the driven body based on the detection value of the position sensor;

a PI control computing section that receives the detected moving speed and the detected deviation and a target value predetermined by a target value determining section and performs a PI control computation;

a steady judgment section that judges from the moving speed and the deviation whether conditions of a steady region are held and starts said PI control computing section by an output signal when the conditions of the steady region are judged to hold to thereby make the PI control computing section execute the PI control computation; and an excitation switching and duty computing section for outputting a power supply control signal of said DC motor based on an output signal of the PI control computing section.

2. The servo control device of a DC motor according to claim 1, wherein the detection value from the position sensor is read in three times and the second largest detection value is adopted.

3. A servo control device of a DC motor comprising:

a DC motor for driving a driven body against a restoring force;

a position sensor for detecting a moving position of said driven body;

a PI control computing section that receives a detection value of the position sensor and a target value predetermined by a target value determining section and performs a PI control computation;

an excitation switching and duty computing section for outputting a power supply control signal of said DC motor based on an output signal of the PI control computing section;

a current detecting section for detecting current passing through said DC motor; and a control section for controlling the excitation switching and duty computing section so as to suppress a variation in said current passing through the DC motor based on a detection value of the current detecting section.

4. The servo control device of a DC motor according to claim 3, wherein the detection value from the position sensor is read in three times and the second largest detection value is adopted.

* * * * *